United States Patent
Kroscher et al.

[19]

[11] Patent Number: 6,029,843

[45] Date of Patent: Feb. 29, 2000

[54] COOKWARE LID

[75] Inventors: Todd W. Kroscher, Two Rivers; Deborah M. Lonneman, Manitowoc; Gerry T. Paul, Whitelaw, all of Wis.

[73] Assignee: Newell Operating Company, Freeport, Ill.

[21] Appl. No.: 09/113,422

[22] Filed: Jul. 10, 1998

[51] Int. Cl.[7] .......................... B65D 51/16; B65D 25/28; B65D 55/00

[52] U.S. Cl. .................... 220/367.1; 220/573.1; 220/772; 220/912

[58] Field of Search .................... 220/253, 254, 220/360, 361, 363, 369, 367.1, 573.1, 912, 913, 370, 372, 772, 212.5; 99/403, 422; 126/373

[56] References Cited

U.S. PATENT DOCUMENTS

| | | |
|---|---|---|
| D. 109,481 | 5/1938 | Jackson . |
| D. 204,996 | 6/1966 | Lepoix . |
| 218,411 | 8/1879 | Wassmer et al. . |
| 377,712 | 2/1888 | Eymer . |
| 751,640 | 11/1904 | Hayes ................................. 99/403 X |
| 950,844 | 3/1910 | Dolan . |
| 1,212,833 | 1/1917 | Stackhouse ...................... 220/212.5 X |
| 1,997,509 | 4/1935 | Betteridge et al. ................ 220/254 X |
| 2,177,487 | 10/1939 | Howlett . |
| 2,637,459 | 5/1953 | Jordan ................................ 220/573.4 |
| 4,000,830 | 1/1977 | French ................................ 220/369 |
| 4,873,918 | 10/1989 | Goldman . |
| 4,982,656 | 1/1991 | Stone . |
| 5,033,453 | 7/1991 | Loyd et al. . |
| 5,065,889 | 11/1991 | Conti ................................. 220/366 X |
| 5,086,939 | 2/1992 | Foulkes, Jr. . |
| 5,307,951 | 5/1994 | Kuhn . |
| 5,377,859 | 1/1995 | Hacker . |
| 5,386,921 | 2/1995 | Kuhn ................................. 220/771 X |
| 5,415,082 | 5/1995 | Nagao . |
| 5,615,607 | 4/1997 | Delaquis et al. . |
| 5,750,967 | 5/1998 | Sprauer, Jr. ........................... 219/735 |

*Primary Examiner*—Allan N. Shoap
*Assistant Examiner*—Rodrigo L Eichwald
*Attorney, Agent, or Firm*—Foley & Lardner

[57] ABSTRACT

A lid for a cooking vessel includes a substantially planar member, a raised periphery and a beveled portion. The substantially planar member has top and bottom surfaces and at least one opening formed therein proximate an edge thereof. The beveled portion is coupled to the edge of the substantially planar member and offsets the substantially planar member from the raised periphery, which lies generally in a plane parallel to the substantially planar member. The lid further includes a vent member coupled to the substantially planar member. The vent member has at least one aperture formed therein and is rotatable to align the at least one aperture with the at least one opening in the substantially planar member for venting or straining of contents placed in the interior cooking region. When the raised periphery of the lid rests on an upper edge of the cooking vessel, the beveled portion extends into an interior cooking region of the cooking vessel, such that moisture that forms on a bottom surface of the lid as a result of heat may drip down the beveled portion into the interior cooking region.

20 Claims, 6 Drawing Sheets

COOKWARE LID

FIELD OF THE INVENTION

The present invention relates to a cooking or baking vessel, such as a pot or pan. More particularly, the present invention relates to a cookware lid capable of venting or straining contents placed in the cooking vessel.

BACKGROUND OF THE INVENTION

Conventional pots are circular in configuration, with a round bottom plate, a side wall extending upwardly from the bottom plate and having a circular upper edge, and a handle projecting from the side wall. Some of these pots further include a circular lid with a single handle or knob projecting from the top center of the lid.

Several problems exist with conventional pots. First, because these pots typically have a vertical side wall, it may be difficult for a user, particularly with larger volume pots, to view the contents inside. Second, the circular configuration of the side wall hampers the user's ability to pour liquids from the pot neatly, as there is no definite channel along which the liquids may flow. Third, the centrally disposed knob on the lid is not ideally located, since the user must reach over the pot to remove the lid. Rising steam or hot air, escaping from the pot as the lid is removed, may injure the user. Further, when the lid is removed from the pot and placed upside down on a countertop, the central knob causes the lid to rock or otherwise move about. Further, an inverted hot lid is not easily picked up from the countertop, because the central lid is, for the most part, inaccessible. In addition, most conventional lids do not provide a feature for venting or straining contents placed in the pot or pan. Instead, the lid must be partially removed from the pan and precariously offset to enable hot air or steam to escape. If straining, either the lid must be held in an offset position to strain off the cooking liquid, which is a clumsy feat that often leads to the loss of a portion of the foodstuffs in the vessel, or the contents of the vessel must be poured through a separate straining utensil, which creates additional cleanup tasks for the cook.

In light of the foregoing, there is a need for an improved cooking vessel. In particular, it is desirable to provide a cooking vessel with increased visibility of the contents within. It is also desirable to provide a cooking vessel that facilitates removal of food or liquids placed therein. It is further desirable to provide a cooking vessel that protects the user from rising steam or hot air when removing the lid from the vessel. In addition, it is desirable to provide a cookware lid that remains stable when inverted on a kitchen surface and may be easily picked up from the surface. Finally, it is desirable to provide a lid capable of venting and straining contents placed in the cooking vessel, without having to remove the lid or to use a separate straining device.

SUMMARY OF THE PRESENT INVENTION

In accordance with one aspect of the present invention, a lid for a cooking vessel having an interior cooking region includes a substantially planar member, a raised periphery and a beveled portion. The substantially planar member has top and bottom surfaces and at least one opening formed therein proximate an edge thereof. The raised periphery extends generally in a plane parallel to the substantially planar member. The beveled portion is coupled to the edge of the substantially planar member and the raised periphery to offset the raised periphery from the substantially planar member. The lid further includes a vent member coupled to the substantially planar member. The vent member has at least one aperture formed therein and is movable to align at least partially the at least one aperture with the at least one opening in the substantially planar member to allow venting or straining of contents placed in the interior cooking region. The raised periphery is configured to rest on an upper edge of the cooking vessel, while the beveled portion extends into the interior cooking region. Accordingly, when contents placed in the interior cooking region are subjected to heat, moisture that forms on the bottom surface of the lid as a result of the heat may drip down the beveled portion into the interior cooking region.

In accordance with another aspect of the invention, a lid for a cooking vessel having an interior cooking region includes a substantially planar member having top and bottom surfaces, a raised periphery, and a beveled portion. The raised periphery extends generally in a plane parallel to the substantially planar member. The beveled portion is coupled to an edge of the substantially planar member and the raised periphery to offset the raised periphery from the substantially planar member. The lid further includes a primary lid handle, which is coupled to the raised periphery and adapted to engage the cooking vessel when the lid covers the interior cooking region.

In accordance with still another aspect of the invention, a cooking utensil includes an open vessel and a lid. The open vessel includes a bottom plate and a side wall extending upwardly from the bottom plate to a flangeless upper edge. The bottom plate and the side wall define an interior cooking region. The lid is engageable with the open vessel to cover the interior cooking region and includes a substantially planar member, a raised periphery, a beveled portion and a vent member. The substantially planar member has top and bottom surfaces and at least one opening formed therein proximate an edge thereof. The raised periphery extends generally in a plane parallel to the substantially planar member and rests on the flangeless upper edge of the open vessel, when the lid covers the interior cooking region. The beveled portion is coupled to the edge of the substantially planar member and the raised periphery to offset the raised periphery from the substantially planar member. The beveled portion also extends into the interior cooking region. The vent member is coupled to the substantially planar member and has at least one aperture formed therein. The vent member may be moved to align at least partially the at least one aperture with the at least one opening of the substantially planar member to allow venting or straining of contents in the interior cooking region.

Other principal features and advantages of the invention will become apparent to those skilled in the art upon review of the following drawings, the detailed description and the appended claims.

BRIEF DESCRIPTION OF THE DRAWINGS

The present invention will become more fully understood from the following detailed description, taken in conjunction with the accompanying drawings, wherein like reference numerals denote like elements, in which.

DETAILED DESCRIPTION OF THE PREFERRED EMBODIMENTS

Figure 1:
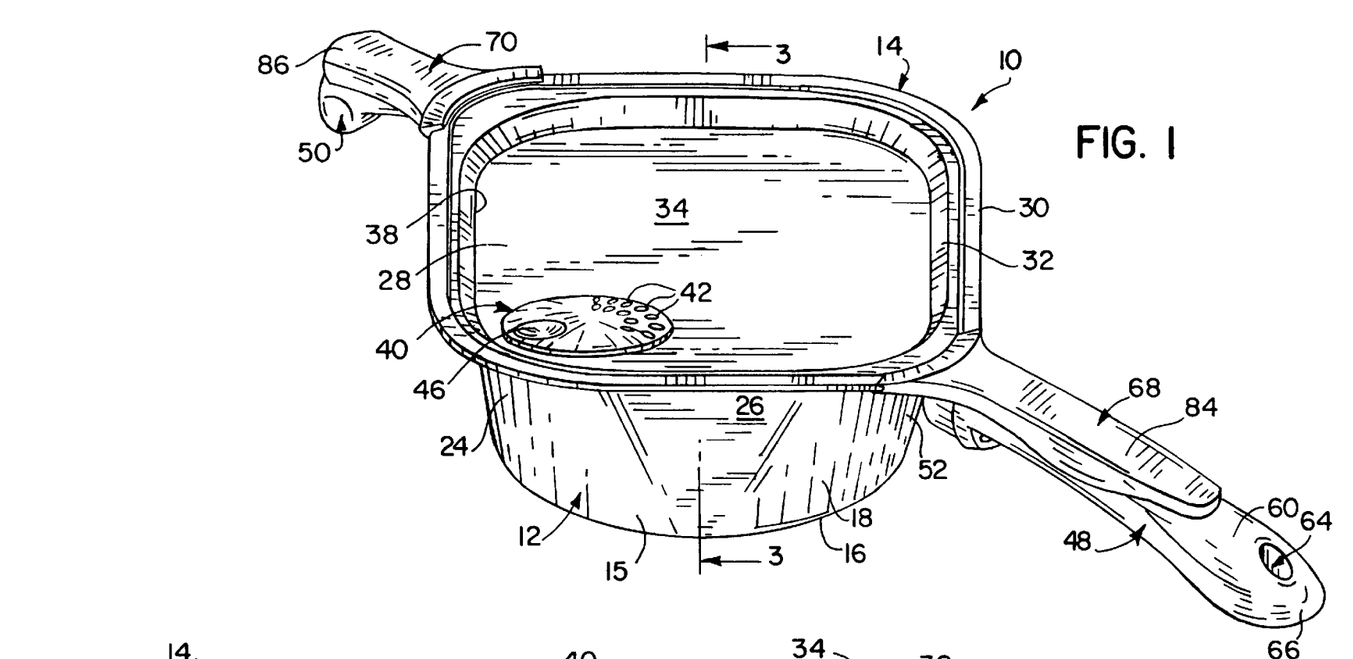
FIG. 1 is a perspective view of a cooking vessel, according to a preferred embodiment of the present invention, including an open vessel and a lid, each having primary and secondary handles, the lid further including a vent member.
Figure 2:
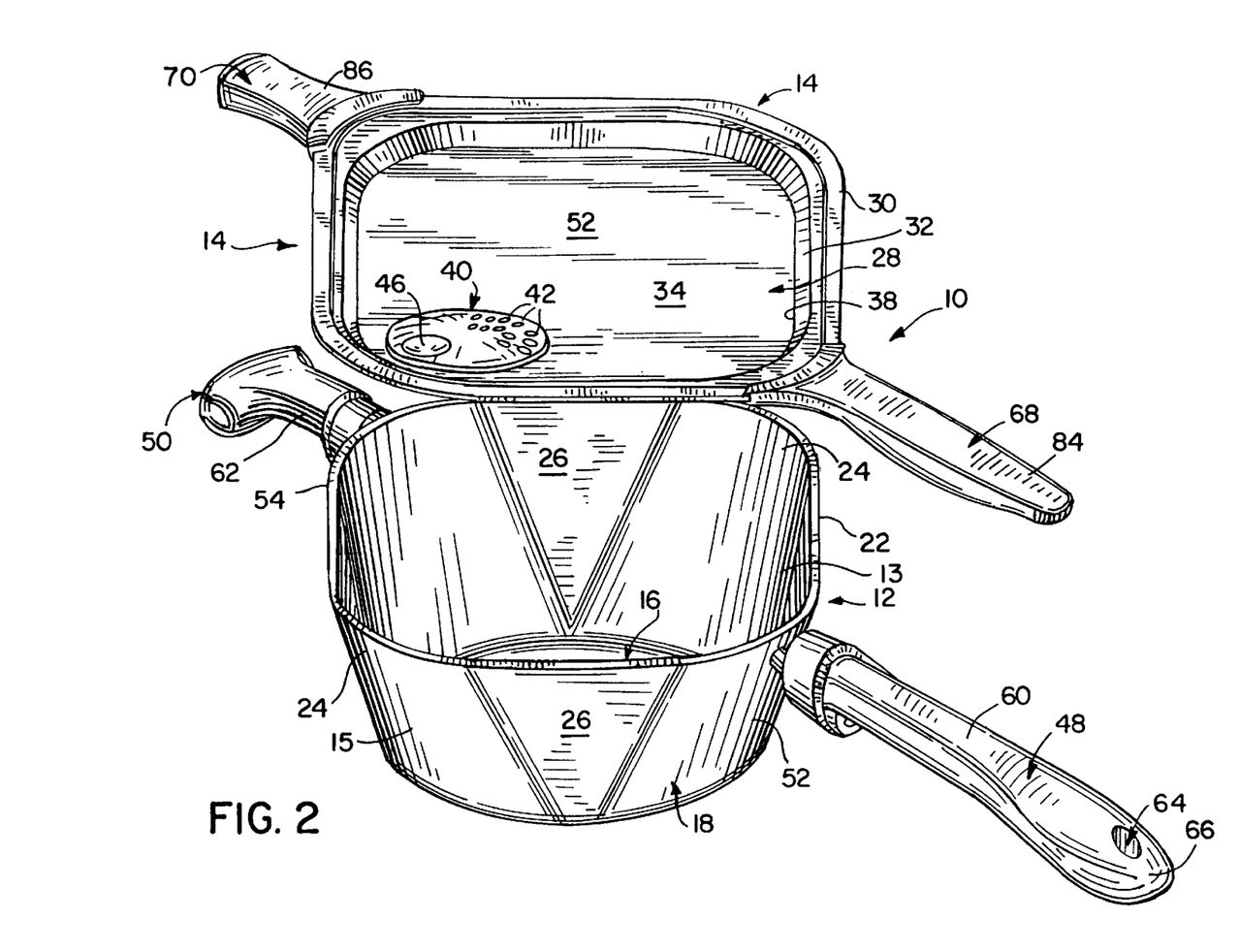
FIG. 2 is a perspective view of the cooking vessel of FIG. 1 with the lid removed from the open vessel.
Figure 3:
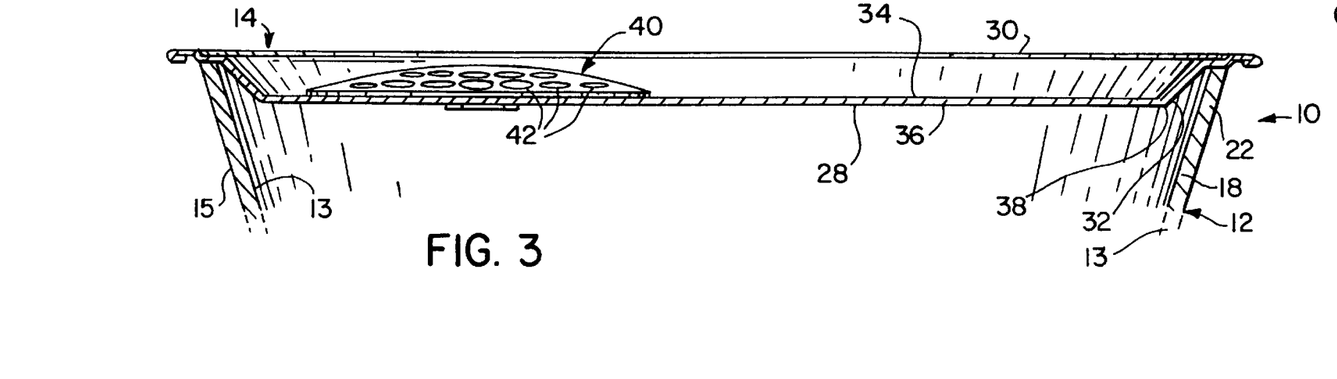
FIG. 3 is a cross-sectional view taken generally along the line 3—3 of FIG. 1.

Referring generally to FIGS. 1–3, an exemplary cooking utensil or vessel 10 in accordance with a preferred embodiment of the invention is provided. Cooking vessel 10 is depicted in FIG. 1 as a pot. However, cooking vessel 10 may also be a pan, such as a fry or saute pan, or a casserole or other type of baking dish (not shown). Cooking vessel 10 includes an open vessel 12 and a removable lid 14 made of a suitable material for conducting heat, such as stainless steel or anodized aluminium. An interior surface 13 (FIGS. 2 and 3) of open vessel 12 may be coated with a non-stick and/or scratch-resistant material, such as SCRATCH-GUARD™ available from Dupont, or any other well-known non-stick and/or scratch-resistant materials. An exterior surface 15 of open vessel 12 may be covered with porcelain (not shown) to present an aesthetic and easy-to-clean surface.

Open vessel 12 includes a bottom plate 16 and a side wall 18 extending upwardly and outwardly from bottom plate 16 to define an interior cooking region 20. Bottom plate 16, which is circular in configuration, is adapted to fit standard size stove top burners (e.g., 6" and 9" diameter burners) to provide for optimum heating of bottom plate 16. However, other sizes of vessels are also contemplated, such as an oversized vessel having a bottom plate 16 that is 11" in diameter. Side wall 18 has an upper edge 22 that is substantially square in configuration. Thus, side wall 18 extends from circular bottom plate 16 to square upper edge 22. Upper edge 22 is preferably flangeless to facilitate pouring of liquids from open vessel 12. It should be appreciated, however, that upper edge 22 may also be provided with a flange.

The round-to-square configuration of open vessel 12 provides several advantages. Because side wall 18 extends upwardly and outwardly from bottom plate 16, providing greater interior cooking space at the top, open vessel 12 enhances visibility of the contents placed in interior cooking region 20 and maximizes the use of the stove top space. In addition, the square configuration of upper edge 22 facilitates the removal of food or liquids from interior cooking region 20. These contents may be poured from open vessel 12 by directing them along a corner 24 of side wall 18. They may also be easily scraped from open vessel 12 by passing a spatula (not shown) along flat portions 26 of side wall 18.

As discussed above, cooking vessel 10 further includes a lid 14. Lid 14 is preferably made of aluminium or stainless steel and may be manufactured by a conventional stamping process. Lid 14 has a square configuration, complementary to that of upper edge 22 of side wall 18 for covering interior cooking region 20. Lid 14 includes a substantially planar member 28, a raised periphery 30 and a beveled portion 32. Substantially planar member 28 has a top surface 34 and a bottom surface 36 (FIGS. 3, 6, 7 and 9) as well as an edge 38. Beveled portion 32 extends upwardly from edge 38 of substantially planar member 28 and offsets raised periphery 30 from substantially planar member 28. Raised periphery 30 lies in a plane generally parallel to substantially planar member 28. When lid 14 is coupled to open vessel 12, raised periphery 30 rests atop upper edge 22 of side wall 18, such that beveled portion 32 and substantially planar member 28 are disposed within interior cooking region 20. Thus, when contents placed in interior cooking region 20 are subjected to heat, moisture that forms on the bottom surface of lid 14 may drip down beveled portion 32 into interior cooking region 20. Thus, unlike conventional dome-shaped lids, when lid 14 is removed, condensation may drip or be easily shaken back into interior cooking region 20 of open vessel 12.

Top surface 34 of substantially planar member 46 is flat. This configuration is advantageous as it allows utensils, such as spoons or spatulas, or other items to be placed on top of lid 14. In addition, larger lids may be used separate from their respective open vessels as baking sheets for placement in an oven. The flat configuration of lid 14 also facilitates storage, as the open vessels may be stacked or hung from an overhead rack, and the lids separately nested and stored. Lid 14 may be provided with ribs (not shown) to reinforce lid 14 and to prevent warping.

Figure 4:
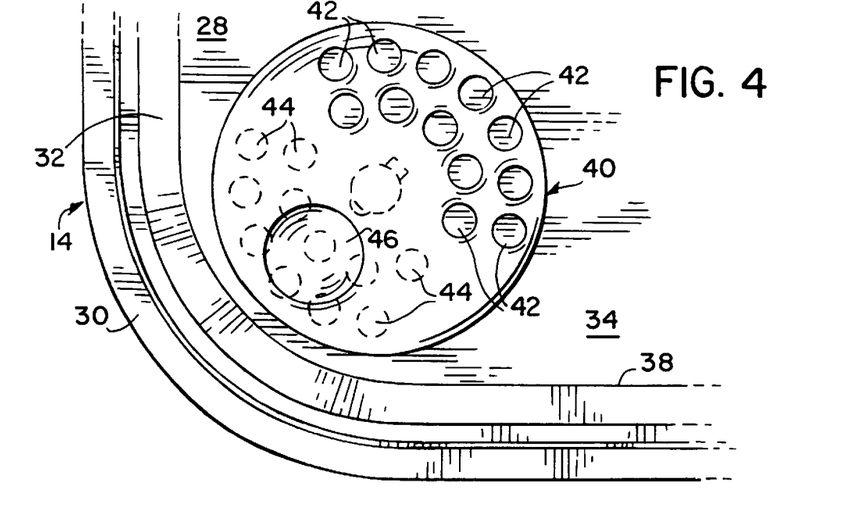
FIG. 4 is an enlarged sectional view of the lid, showing the vent member in a closed position.
Figures 5, 6:
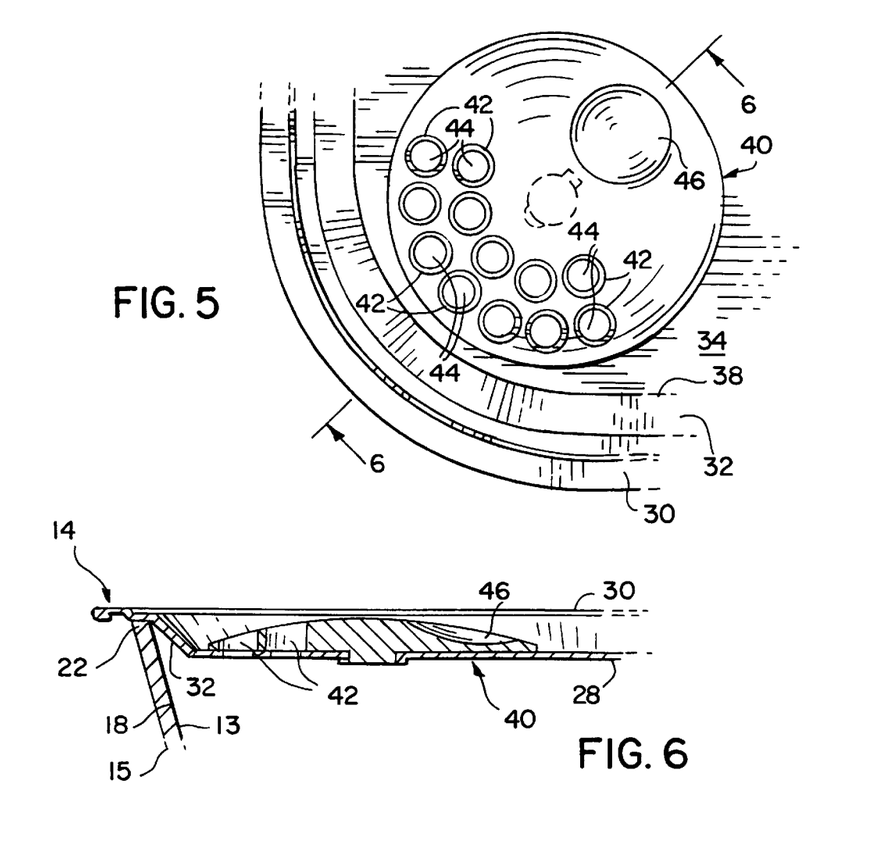
FIG. 5 is an enlarged sectional view of the lid, showing the vent member in an open position.
FIG. 6 is a cross-sectional view taken generally along the line 6—6 of FIG. 5.

Referring now to FIGS. 4–6, lid 14 further includes a vent plate or member 40. Vent member 40 is coupled to substantially planar member 28 proximate edge 38 at a corner of lid 14. Vent plate 40 may be snapped into engagement with substantially planar member 28 of lid 14. Alternatively, there may be a key fit between vent plate 40 and substantially planar member. In the preferred embodiment, vent plate 40 is a rotatable, circular disk made of nylon and having a plurality of apertures 42 formed therein. Vent plate 40 is rotatable between a closed position (FIG. 4) and an open position (FIG. 5). In the open position, apertures 42 of vent plate 40 are aligned with openings 44, formed in substantially planar member 28 of lid 14, to enable air, steam or liquids to escape from interior cooking region 20. In the closed position, vent plate 40 is rotated such that apertures 42 are disposed opposite openings 44, thereby preventing air, steam or liquids from leaving interior cooking region 20. It should be noted that, in lieu of a plurality of openings 44, a single, large opening may be formed in substantially planar member 28. It may also be contemplated that vent plate 40 has a square, hexagonal or other configuration. Further, vent plate 40 may slide, rather than rotate, between open and closed positions, or may include a movable portion that can be lifted to expose apertures 42 and openings 44.

As illustrated in FIGS. 3 and 6, vent plate 40, which is coupled to substantially planar member 28, does not extend above raised periphery 30 of lid 14. Accordingly, raised periphery 30 presents a flat upper plane upon which other pots or pans may be stacked. In addition, because substantially planar member 28 is offset from raised periphery 30, any liquid that may boil over from interior cooking region 20 of open vessel 12 will be contained on top surface 34 of lid 14, thereby preventing spillage on the stove top. This overflow liquid may then be transferred back to interior cooking region 20.

Vent plate 40 further includes a finger depression 46 for facilitating rotation of vent plate 40 to align apertures 42 with openings 44 formed in substantially planar member 28. In the alternative or in addition, a tab or projection (not shown) may be provided to facilitate rotation of vent plate 40. Thus, the user may use a finger or a utensil to rotate vent plate 40.

In addition to its venting capability, lid 14 may further be used to strain contents placed in interior cooking region 20. With vent plate 40 in the open position, open vessel 12 and lid 14 may be tipped or inverted to drain liquid from interior cooking region 20. Vent plate 40 is preferably removably coupled to substantially planar member 28 of lid 14 and may be detached from lid 14 for cleaning. As a precaution, the detachment arrangement may be keyed such that vent plate 40 may only be separated from lid 14 when in the closed position. In addition, interchangeable vent plates, having different numbers and sizes of apertures, may be provided for straining various contents placed in interior cooking region 20.

Figures 7, 8:
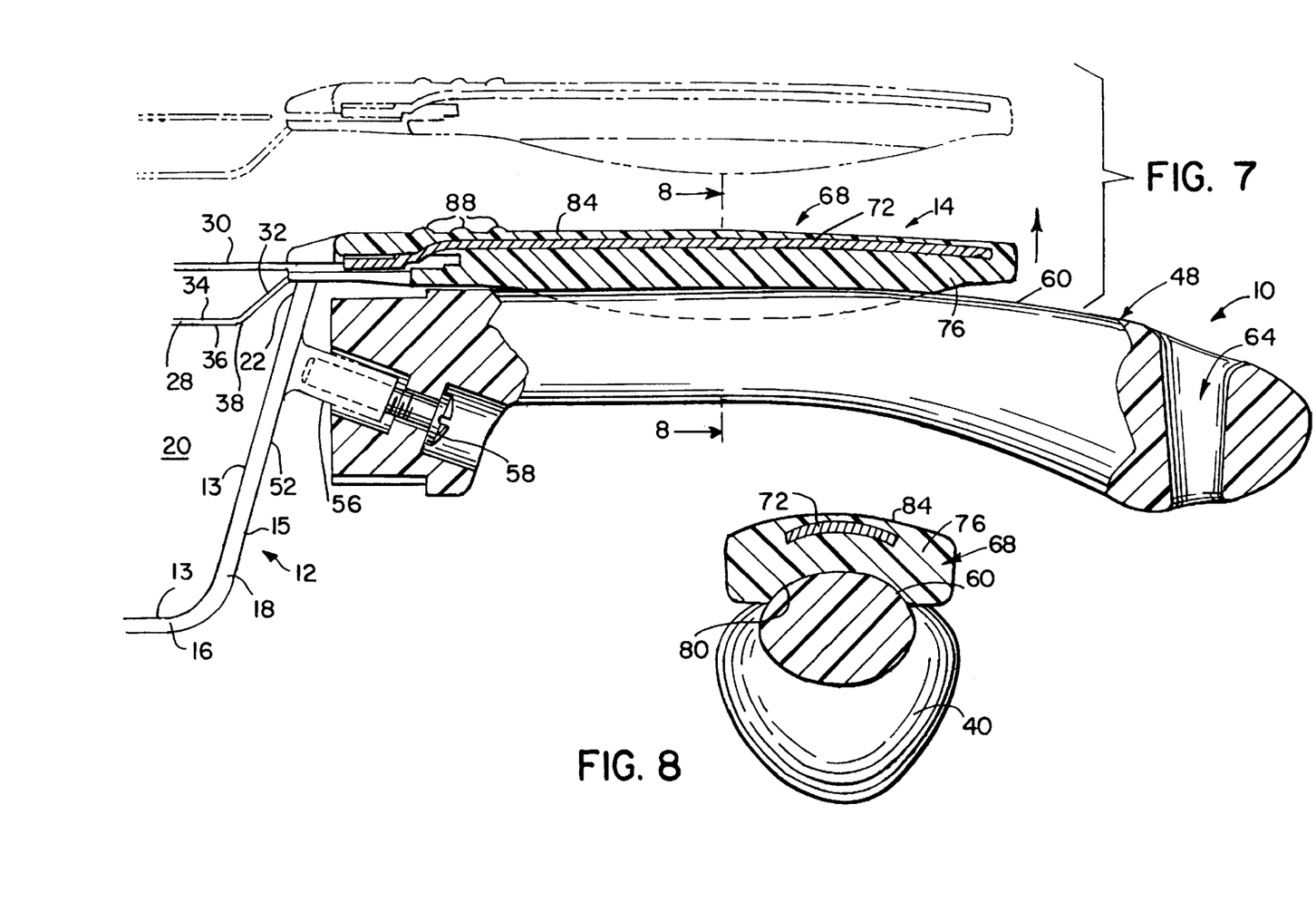
FIG. 7 is a partial cross-sectional view of the primary handles of the cooking vessel.
FIG. 8 is a cross-sectional view taken generally along the line 8—8 of FIG. 7.
Figures 9, 10:
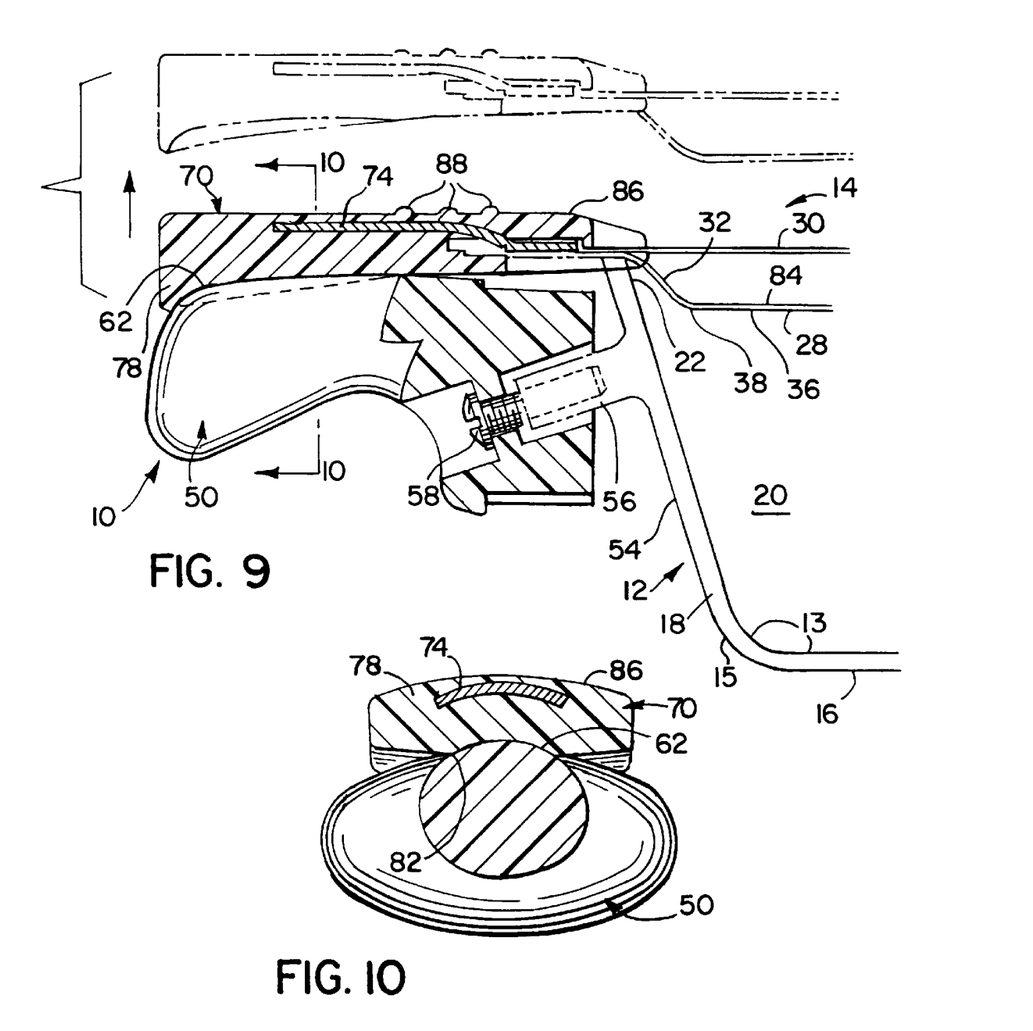
FIG. 9 is a partial cross-sectional view of the secondary handles of the cooking vessel.
FIG. 10 is a cross-sectional view taken generally along the line 10—10 of FIG. 9.

Referring back to FIGS. 1–3 and to FIGS. 7–10, open vessel 12 is provided with a primary handle 48 and a secondary handle 50. Primary and secondary handles 48 and 50 are oppositely disposed at respective corners 52 and 54 of side wall 18 and are attached to a bracket 56 extending from side wall 18 by a mechanical fastener, such as a bolt or screw 58 (FIGS. 7 and 9). Preferably, screw 58 does not extend into interior cooking region 20. The smooth profile of interior surface 13 of open vessel 12 makes cleaning easy, as there is no place for food to become trapped. In the alternative, handles 48 and 50 may be riveted to side wall 18. While two oppositely disposed handles are provided in the preferred embodiment, open vessel 12 may include a single handle. Handles 48 and 50 are located near upper edge 22 of side wall 18 for engagement with handles of lid 14, as will be described in greater detail below.

Primary and secondary handles 48 and 50 each have a convex upper surface 60 and 62, respectively, and are ergonomically designed to provide a user with a comfortable grip. The outer surface of handles 48 and 50 includes a heat-resistant material, such as silicone, capable of withstanding temperatures of at least 500° F., such that cooking vessel 10 may be placed in an oven. Handles 48 and 50 may be injection molded or otherwise formed of silicone. Silicone is preferable because of its high coefficient of friction, thereby providing the handle with a non-slip grip.

In addition, primary handle 48 has an opening 64 formed therein adjacent a distal end 66 of the handle. Opening 64 enables open vessel 12 to be stored overhead on a rack (not shown).

Lid 14 further includes a primary lid handle 68 and a secondary lid handle 70. Primary and secondary lid handles 68 and 70 are preferably attached to raised periphery 30 of lid 14 and are disposed at opposite corners thereof. Primary and secondary lid handles 68 and 70 engage primary and secondary vessel handles 48 and 50, respectively, when lid 14 covers interior cooking region 20. Each of primary and secondary lid handles 68 and 70 includes a steel portion 72 and 74, respectively, covered by a heat-resistant sleeve 76 and 78, respectively. In the preferred embodiment of the invention, sleeves 76 and 78 are made of silicone.

The extension of primary and secondary lid handles 68 and 70 from raised periphery 30 makes lid 14 superior to conventional lids. Conventional lids have a single handle or knob provided at the center of a top surface of the lid. The location of this knob requires a user to reach over the lid in order to remove it from the cooking vessel and may subject the user's arm to steam or hot air, which may escape from the interior cooking region of the cooking vessel when the lid is removed In the present invention primary and secondary lid handles 68 and 70 extend from raised periphery 30. This arrangement of primary and secondary lid handles 68 and 70 keeps the user away from rising steam or hot air, since the user does not need to reach over cooking vessel 10 to remove lid 14. In addition, lid 14 will not wobble when placed upside down on a counter top, and lid handles 68 and 70 remain easily accessible in this position.

As illustrated in greater detail in FIGS. 7–10, primary and secondary lid handles 68 and 70 of the preferred embodiment of the invention are configured to rest atop respective primary and secondary handles 48 and 50 of open vessel 12. Primary lid handle 68 has a concave lower surface 80 (FIG. 8) which matingly engages convex upper surface 60 of primary vessel handle 48. Similarly, secondary lid handle 70 has a concave lower surface 82 (FIG. 10) which matingly engages convex upper surface 62 of secondary vessel handle 50. Accordingly, with one hand a user may simultaneously grasp primary lid handle 68 and primary vessel handle 48 to lift cooking vessel 10. The user may also grasp secondary lid handle 70 and secondary vessel handle 50 to aid in lifting cooking vessel 10. In the alternative, primary and secondary lid handles 68 and 70 may be provided with a latch or locking arrangement to secure them to open vessel 12.

Primary and secondary lid handles 68 and 70 have respective upper surfaces 84 and 86, each of which includes a plurality of ridges 88 for preventing the user's hand from slipping and contacting cooking vessel 10. Ridges 88 may be bumps, grooves or any other arrangement that provides the user with tactile information as to the attached end of the handle.

Figure 11:
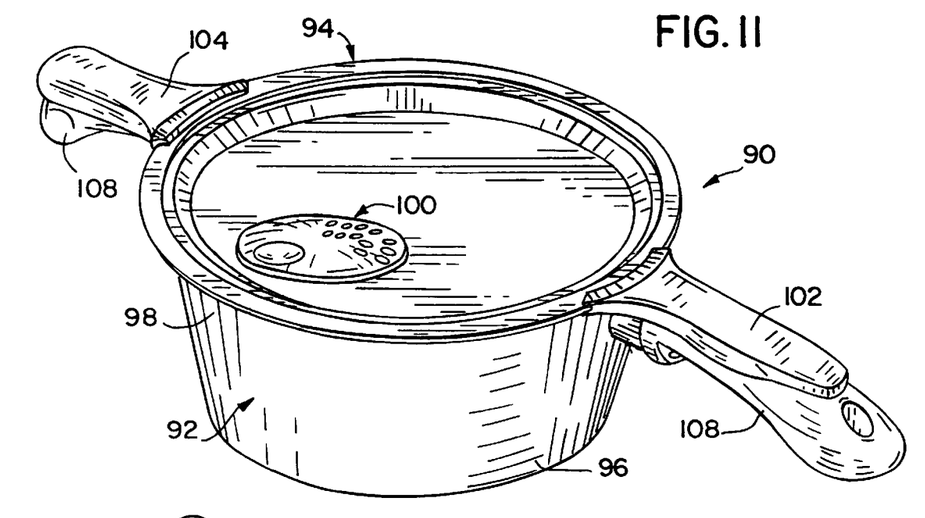
FIG. 11 is a perspective view of a cooking vessel, according to an alternative embodiment of the present invention.
Figure 12:
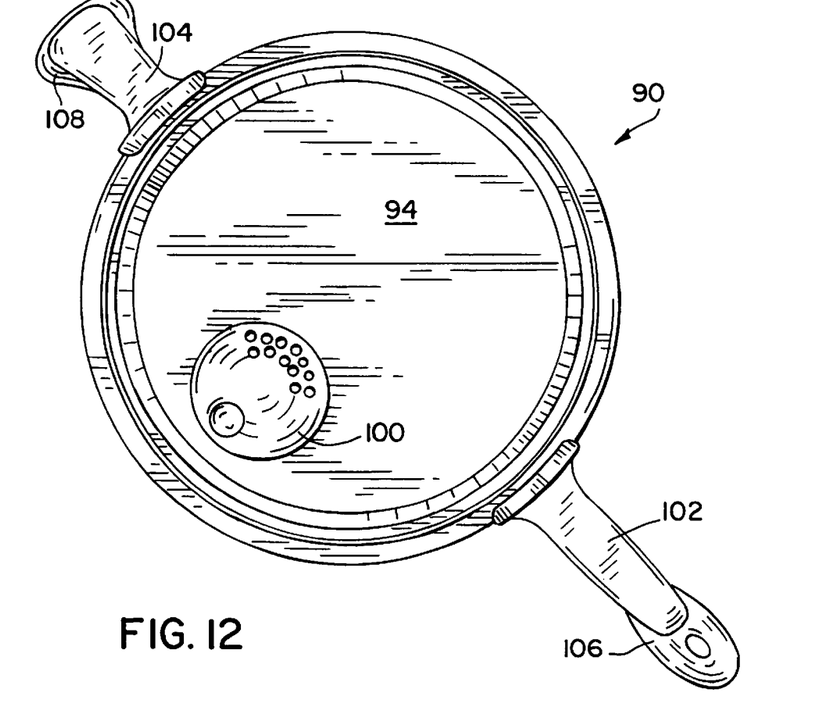
FIG. 12 is a top plan view of the cooking vessel of FIG. 11.

FIGS. 11 and 12 illustrate a cooking vessel 90 in accordance with an alternative embodiment of the invention. Cooking vessel 90 includes an open vessel 92 and a lid 94, similar to that of cooking vessel 10. However, lid 94 is circular, rather than square, in configuration, and rests atop a side wall 96 of open vessel 92 having a circular upper edge 98. Lid 94 includes a vent plate 100, identical to vent plate 40. Primary and secondary lid handles 102 and 104 engage respective primary and secondary vessel handles 106 and 108 as discussed above with respect to cooking vessel 10.

It will be understood that the foregoing description is of the preferred embodiments of this invention and that the invention is not limited to the specific forms shown or described. For example, the lid may have shapes other than the square and circular configurations that have been described, such that the lid may be used in conjunction with a variety of different types of cookware or bakeware. As one example, a conventional pot may include a pouring spout which protrudes from the periphery of the pot's otherwise circular upper edge. In such a case, the lid would also include a protruding portion which would cover the pot's pouring spout. It is also contemplated that the lid could have a triangular, rectangular or oval shape. These and other modifications may be made in the design and arrangement of the elements without departing from the scope of the invention as expressed in the appended claims.

What is claimed is:

1. A lid for a cooking vessel having an interior cooking region, the lid comprising:

a substantially planar member having top and bottom surfaces, and at least one opening formed therein proximate an edge of the substantially planar member;

a raised periphery extending generally in a plane parallel to the substantially planar member;

a beveled portion coupled to the edge of the substantially planar member and the raised periphery, the beveled portion offsetting the raised periphery from the substantially planar member; and a vent member coupled to the substantially planar member, the vent member having at least one aperture formed therein and being movable to align at least partially the at least one aperture with the at least one opening of the substantially planar member to allow venting or straining of contents placed in the interior cooking region, wherein the raised periphery is configured to rest on an upper edge of the cooking vessel and the beveled portion is configured to extend into the interior cooking region such that, when contents placed in the interior cooking region are subjected to heat, moisture that forms on the bottom surface of the lid as a result of the heat may drip down the beveled portion into the interior cooking region.

2. The lid of claim 1, wherein the vent member is removably coupled to the substantially planar member.

3. The lid of claim 1, wherein the vent member is comprised of nylon.

4. The lid of claim 1, wherein the lid has a square configuration, and the vent member is located proximate a corner of the lid.

5. The lid of claim 1, wherein the lid has a circular configuration.

6. The lid of claim 1, further comprising a primary lid handle adapted to engage a primary handle of the cooking vessel when the lid covers the interior cooking region.

7. The lid of claim 6, wherein an outer surface of the primary lid handle includes a heat-resistant material capable of withstanding temperatures of at least approximately 500° F.

8. The lid of claim 6, further comprising a secondary lid handle adapted to engage a secondary handle of the cooking vessel when the lid covers the interior cooking region.

9. A lid for a cooking vessel having a body member terminating at an upper peripheral edge to define an interior cooking region, the lid comprising:

a substantially planar member having top and bottom surfaces;

a raised periphery extending generally in a plane parallel to and raised above the substantially planar member;

a beveled portion coupled to an edge of the substantially planar member and the raised periphery, the beveled portion offsetting the raised periphery from the substantially planar member such that the beveled portion and the substantially planar member define a recessed cover region; and a primary lid handle coupled to the raised periphery, the primary lid handle being adapted to engage the cooking vessel when the lid covers the interior cooking region, wherein, when the raised periphery rests on the upper peripheral edge of the cooking vessel, the recessed cover region extends below the upper peripheral edge into the interior cooking region; wherein the substantially planar member has an opening formed therein proximate the edge, and further comprising a vent member coupled to the substantially planar member, the vent member having a plurality of apertures formed therein and being movable to align at least a portion of the plurality of apertures with the at least one opening of the substantially planar member to allow venting or straining of contents placed in the interior cooking region.

10. The lid of claim 9, wherein the primary lid handle includes a heat-resistant material capable of withstanding temperatures of at least approximately 500° F.

11. The lid of claim 9, wherein the primary lid handle is adapted to engage a primary handle of the cooking vessel.

12. The lid of claim 11, further comprising a secondary lid handle adapted to engage a secondary handle of the cooking vessel when the lid covers the interior cooking region.

13. The lid of claim 9, wherein the vent member is removably coupled to the substantially planar member.

14. The lid of claim 9, wherein the vent member is rotatable.

15. The lid of claim 9, wherein the lid has a square configuration, and the vent member is located proximate a corner of the lid.

16. A cooking utensil comprising:

an open vessel including a bottom plate and a side wall extending upwardly from the bottom plate to a flangeless upper edge, the bottom plate and the side wall defining an interior cooking region; and a lid engageable with the open vessel to cover the interior cooking region, the lid including:

a substantially planar member having top and bottom surfaces, and at least one opening formed therein proximate an edge of the substantially planar member;

a raised periphery extending generally in a plane parallel to the substantially planar member, the raised periphery resting on the flangeless upper edge of the open vessel when the lid covers the interior cooking region;

a beveled portion coupled to the edge of the substantially planar member and the raised periphery, the beveled portion offsetting the raised periphery from the substantially planar member and extending into the interior cooking region when the lid covers the interior cooking region; and a vent member coupled to the substantially planar member, the vent member having at least one aperture formed therein and being movable to align at least partially the at least one aperture with the at least one opening of the substantially planar member to allow venting or straining of contents in the interior cooking region.

17. The cooking utensil of claim 16, wherein the open vessel includes at least one vessel handle attached to the side wall proximate the flangeless upper edge, and the lid includes at least one lid handle matingly engageable with the at least one vessel handle.

18. The cooking utensil of claim 17, wherein an outer surface of the at least one vessel handle and the at least one lid handle include a heat-resistant material capable of withstanding temperatures of at least approximately 500° F.

19. The cooking utensil of claim 16, wherein the bottom plate of the open vessel has a circular configuration.

20. The cooking utensil of claim 19, wherein the lid has a square configuration and the plate is located proximate a corner of the lid.

* * * * *